June 5, 1928.
W. M. NUTTING
TRUCK
Filed April 15, 1925        2 Sheets-Sheet 2
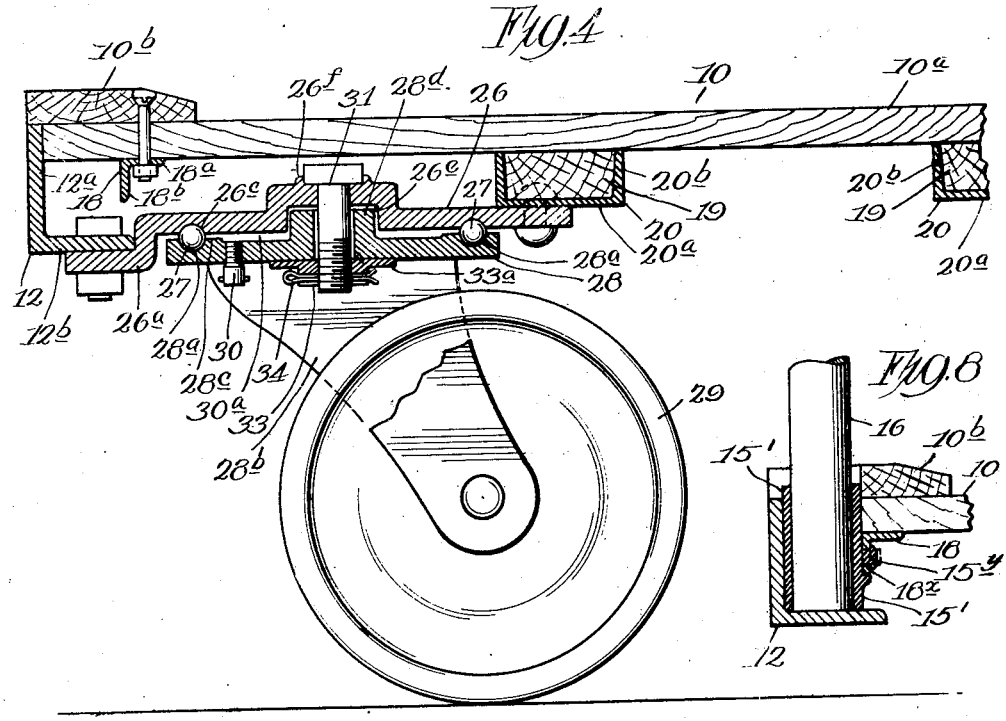
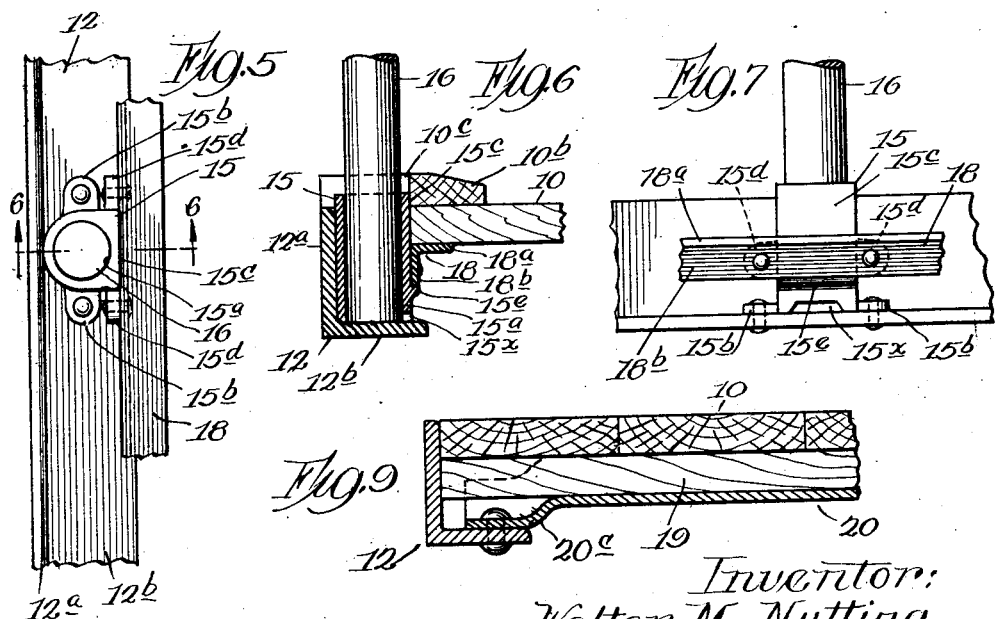
Inventor:
Walter M. Nutting
By Wallace R. Lane Atty.

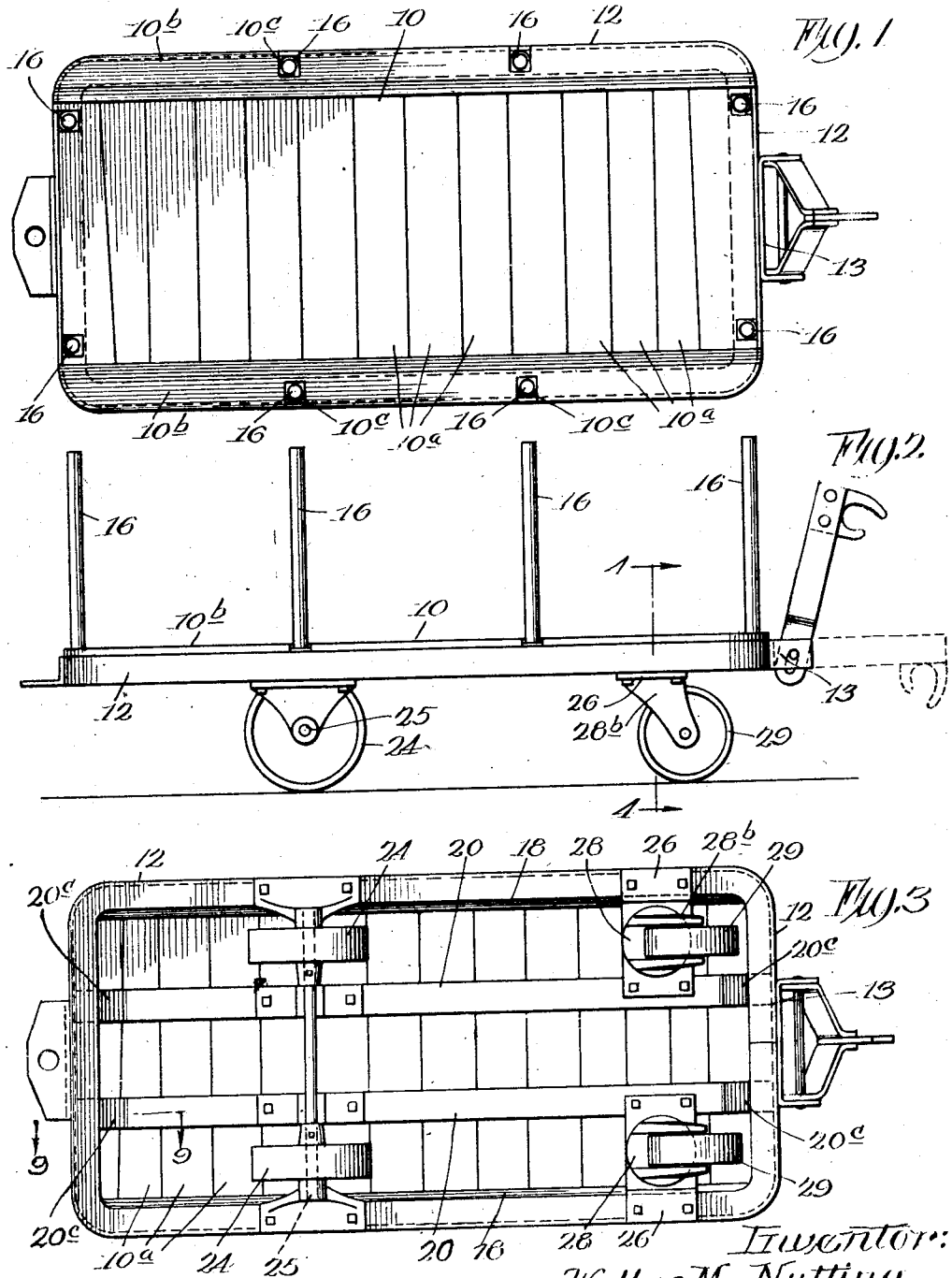

Patented June 5, 1928.

1,672,035

UNITED STATES PATENT OFFICE.

WALTER M. NUTTING, OF FARIBAULT, MINNESOTA, ASSIGNOR TO NUTTING TRUCK CO., OF FARIBAULT, MINNESOTA, A CORPORATION OF MINNESOTA.

TRUCK.

Application filed April 15, 1925. Serial No. 23,265.

This invention relates to improvements in trucks, more particularly that class of truck which is known as a floor or trailer truck. The object of the invention is to provide a compact, strong and easily assembled structure, and one containing a novel caster construction.

This and other objects will be more fully set forth and described in the following specification, and shown in the accompanying drawings, in which, Fig. 1 is a plan view of an embodiment of my truck.

Fig. 2 is a side elevation of the same.

Fig. 3 is a bottom view of the same.

Fig. 4 is a vertical section along the line 4—4 of Fig. 2, drawn to an enlarged scale to illustrate the caster construction.

Fig. 5 is a plan view of a portion of the side frame construction with the platform removed.

Fig. 6 is a vertical section along the line 6—6 of Fig. 5.

Fig. 7 is a side elevation of the structure shown in Fig. 5.

Fig. 8 is a view similar to Fig. 6, showing a modification.

Fig. 9 is a vertical section along the line 9—9 of Fig. 3.

Like numerals refer to like elements throughout the drawings in which 10 indicates generally the platform, formed of transverse planks $10^a$, to which are secured longitudinal, beveled side planks $10^b$, certain planks of the platform being provided with the apertures $10^c$ to fit over stake-sockets hereinafter described.

The truck is provided with a rectangular surrounding frame member 12, formed, in the embodiment illustrated, of a single angle bar, having the vertical flange $12^a$ and horizontal inwardly directed flange $12^b$. This frame member 12 is, as stated, bent to rectangular form, and has its free ends meeting at the front of the truck, where a channeled plate 13 is riveted or otherwise secured to the frame member, thereby securing the ends of the frame member.

Located at desired intervals about the frame member are the stake-socket members 15, centrally bored or apertured at $15^a$ to accommodate the ends of the stakes 16, and provided with ports $15^x$ at the bottom for escape of dirt, water or the like. The socket members are provided with base lugs or ears $15^b$, which are riveted or otherwise secured to the flange $12^b$ of the frame member. The socket members are provided with the flat vertical face $15^c$ facing inwardly of the truck frame and at either side thereof are provided the ears $15^d$. On the face $15^c$ is provided a rib or seating lug $15^e$. Supported by these members 15 at each side of the truck are longitudinally extending angles 18 having a flange $18^a$ horizontally and inwardly directed, and the other flange $18^b$ vertically arranged to contact with the faces $15^c$ of the members 15, being secured by rivets or the like to the ears $15^d$, and partially supported by the ribs or lugs $15^e$, as shown in Figs. 5 to 7, for example. The platform member 10 is supported upon the flanges $18^a$ of angles 18 with the apertures $10^c$ fitting over the upper portions of the socket members 15. This construction permits the use of a relatively deep frame member 12, since by locating the supporting angles 18 intermediate the top and bottom of the frame member 12, the platform 10 will be located substantially flush with the sides of the frame member when in assembled relation thereto.

In Fig. 8 I have illustrated a modified form of construction in which the socket member 15′ differs from the previously described members 15 in that a small lug or boss $15^y$ protrudes from the flat surface thereof and extends through an aperture $18^x$. After assembly the protruding end of the lug $15^y$ is riveted or upset to secure the angle bar in proper assembled relation. This permits the dispensing with lugs or ears $15^d$ of the previously described form.

Extending between the ends of the frame member 12 and secured thereto, are the spaced longitudinal sills 20 of channeled form in the embodiment illustrated, being arranged with the central web $20^a$ at the bottom, and the flanges $20^b$ extending vertically upward therefrom. The platform 10 may also be partially supported upon the beams 19 seated in the channels 20 (see Fig. 9), and to properly position the same without the use of an excessively deep channel, I may offset the ends $20^c$, as shown in Fig. 3, for example, the beams 19 extending in straight lines over the offset ends $20^c$.

At the rear of the truck are provided supporting wheels 24, carried on any desirable form of axle 25, suitably journaled at and intermediate its extremities, as indicated in Fig. 3, for example.

At the front, supporting wheels are preferably arranged in this type of truck for swivel motion, and to obtain this result, I provide upper caster plates 26, extending between one side of the frame member 12 and the adjacent channel 20, as illustrated in Fig. 4. These upper caster members are secured by bolts or other suitable fastening means to the side frame and channel, the outer ends of such caster plates being slightly offset at 26$^a$ to underlie the horizontal flange 12$^b$ of the side frame member. These caster plates are preferably formed of cast metal and an annular ball-race 26$^c$ is machined in one face thereof, to accommodate the bearing-balls 27. Coacting with each of the upper caster plates 26 is a movable plate 28 having a coacting or complementary annular ball-race 28$^a$, and provided with the bifurcated or spaced arms or forks 28$^b$ between which is mounted the supporting wheel 29 in well-known manner. The plate 28 is provided with the raised annular shoulder 28$^c$ surrounding the ball-race 28$^a$, to lie closely adjacent to the face of the caster plate 26. A grease or lubricating aperture is provided in the plate 28 and a cup 30 is threaded thereinto to permit forced lubrication in well-known manner, the space 30$^a$ between the plates 26 and 28 providing a lubricant chamber. At its central portion, the plate 28 is provided with the raised boss 28$^d$, which is apertured to loosely accommodate the king-pin 31. The caster plate 26 is correspondingly recessed at 26$^e$ to accommodate the boss 28$^d$, and this raised portion is also apertured to permit extension of the king-pin therethrough, the upper surface being provided with the positioning lugs 26$^f$ to properly position and hold the king-pin against undesired rotation. At its lower end, the king-pin 31 is threaded for engagement by a castellated nut 33, which is provided with the peripherally extending wide flange 33$^a$ beneath the plate 28, a cotter-pin 34 extending through the nut and king-pin.

In the caster construction shown and described, lateral movement of the wheel-carrying plate beyond a reasonable limit, is prevented by the boss 28$^d$, which will relieve the bearing-balls 27 of lateral thrust. Furthermore, the upper extension of the boss 28$^d$ ordinarily prevents the lubricating grease, or the like, from leaking out through the king-pin aperture, unless an excess of such lubricant is supplied. Such an excess is occasionally applied in order that the adjacent surfaces of nut 33 and plate 28 may be lubricated.

With the caster construction shown, the king-pin 31 will permit sufficient lateral movement of the plate 28 as to permit the lateral thrust of the wheel to be received by the boss 28$^d$ and the recess 26$^e$ in which it fits. The extended contact surface 33$^a$ of nut 33 is ample to accommodate such slight friction as may exist between the movable plate 28 and the nut, it being only occasionally that frictional contact will exist, and that only arising from suspension of the movable plate, fork and wheel due to relative rise of the truck with respect to such wheel. Should wear occur between the balls 27 and the ball-races 28$^a$ and 26$^c$, or between the nut 33 and the plate 28, adjustment may readily be made therefor by taking up the castellated nut 33 on the king-pin 31.

It will be obvious that the construction described and shown above permits the ready, economical manufacture of a strong and compact device of this character. It will also be obvious that the structure shown and described is susceptible of modification and change, and I do not wish to be restricted to the form shown and described, except as defined in the appended claims.

What I claim is:

1. A truck comprising a rectangular frame member having a horizontal inwardly directed flange, socket members located upon and carried by said flange, and platform supporting angle bars substantially parallel to and adjacent the sides of said frame, said bars being supported by said socket members.

2. A truck comprising a rectangular frame member, having an inwardly directed horizontal flange below the top of said member, socket members located upon and carried by said flange, and platform supporting angle bars substantially parallel to and adjacent the sides of said frame, said bars being supported upon said socket members.

3. A truck comprising a rectangular frame member having an inwardly directed horizontal flange beneath the top thereof, socket members located upon and carried by said flange, and angle bars extending between the sockets substantially parallel to and adjacent the sides of said frame member, said bars being secured to and supported by said socket members.

4. A truck comprising a rectangular frame member having an inwardly directed horizontal flange beneath the top thereof, socket members located upon and carried by said flange, angle bars extending between the sockets substantially parallel to and adjacent the sides of said frame member, said bars being secured to and supported by said socket members beneath the top of said frame member, and a platform supported by said bars and substantially flush with the top of said frame member.

5. A truck comprising a rectangular frame member having an inwardly directed horizontal flange beneath the top thereof, socket members located upon and carried by said flange, angle bars extending between the sockets substantially parallel to and adjacent the sides of said frame member, said bars being secured to and supported by said socket members beneath the top of said frame member, a platform supported by said bars and substantially flush with the top of said frame member, and fastening means extending through said platform and securing the same to said bars.

6. A truck comprising a rectangular frame member having an inwardly directed horizontal flange beneath the top thereof, socket members located upon and carried by said flange, and angle bars extending between the sockets substantially parallel to and adjacent the sides of said frame member, said bars being secured to and supported by said socket members, said socket members being provided with lugs, said bars being apertured for engagement by said lugs.

7. A truck comprising a rectangular frame member having an inwardly directed horizontal flange beneath the top thereof, socket members located upon and carried by said flange, and angle bars extending between the sockets substantially parallel to and adjacent the sides of said frame member, said bars being secured to and supported by said socket members, said socket members being provided each with a plane face and attachment means, said angle bars each having a flange in contact with said plane faces and secured to said attachment means.

8. A truck comprising a rectangular frame member having an inwardly directed horizontal flange beneath the top thereof, socket members carried by said flange, platform supporting bars substantially parallel to and adjacent the sides of said frame member, said bars being supported by said socket members beneath the plane of the top of said frame member, a longitudinal sill extending between the front and rear of said frame member and secured to said horizontal flange, said sill being depressed at its end portions and having its top mounted in substantially the plane of said supporting bars, and a platform extending across and supported by said bars and sill.

9. A truck comprising a rectangular frame member having an inwardly directed horizontal flange beneath the top thereof, socket members carried by said flange, platform supporting bars substantially parallel to and adjacent the sides of said frame member, said bars being supported by said socket members beneath the plane of the top of said frame member, a longitudinal sill extending between the front and rear of said frame member and secured to said horizontal flange, said sill being depressed at its end portions and having its top mounted in substantially the plane of said supporting bars, a platform extending across and supported by said bars and sill, and caster plates extending between said sill and said horizontal flange, said plates being offset for engagement with said flange and being secured thereto and to said sill.

In witness whereof, I hereunto subscribe my name to this specification.

WALTER M. NUTTING.